(12) United States Patent
Malfavon

(10) Patent No.: US 10,494,994 B2
(45) Date of Patent: Dec. 3, 2019

(54) MULTI-APPLICATION POWER UNIT FOR DRIVING PLURAL APPLIANCES

(71) Applicant: Vidal Malfavon, Norwalk, CA (US)

(72) Inventor: Vidal Malfavon, Norwalk, CA (US)

(*) Notice: Subject to any disclaimer, the term of this patent is extended or adjusted under 35 U.S.C. 154(b) by 690 days.

(21) Appl. No.: 15/193,046

(22) Filed: Jun. 25, 2016

(65) Prior Publication Data

US 2016/0377218 A1 Dec. 29, 2016

Related U.S. Application Data

(60) Provisional application No. 62/184,722, filed on Jun. 25, 2015.

(51) Int. Cl.
*F02B 63/04* (2006.01)
*F16C 1/26* (2006.01)
*F16C 1/06* (2006.01)
*H02K 7/14* (2006.01)
*F16D 1/02* (2006.01)
(Continued)

(52) U.S. Cl.
CPC ............ *F02B 63/04* (2013.01); *F02B 63/044* (2013.01); *F02B 63/047* (2013.01); *F16C 1/06* (2013.01); *F16C 1/26* (2013.01); *F16C 1/28* (2013.01); *F16D 1/02* (2013.01); *F16D 1/0847* (2013.01); *F16D 1/0876* (2013.01); *F16D 1/101* (2013.01); *F16H 7/02* (2013.01); *F16H 7/18* (2013.01); *F16H 9/26* (2013.01); *F16H 21/04* (2013.01); *F16H 21/44* (2013.01); *F16H 35/18* (2013.01); *F16M 3/00* (2013.01); *H02K 7/14* (2013.01); *F16C 2360/22* (2013.01); *F16D 2001/103* (2013.01)

(58) Field of Classification Search
CPC ...... F16C 1/26; F16C 1/06; F16C 1/28; F16C 2360/22; F16D 1/02; F16D 1/0847; F16D 1/0876; F16D 1/101; F16D 2001/103; F16H 7/02; F16H 7/18; F16H 9/26; F16H 21/04; F16H 21/44; F16H 35/18; F16H 2057/02034; F16H 7/14; F16M 3/00; F02B 63/04; F02B 63/044; F02B 63/047; H02K 7/14; H02K 7/145

USPC ........ 74/16; 123/2; 290/1 A; 322/1; 415/916
See application file for complete search history.

(56) References Cited

U.S. PATENT DOCUMENTS 1,826,075 A 10/1931 Jackson
2,743,747 A 5/1956 Franks
(Continued)

OTHER PUBLICATIONS

US 4,939,323, 02/1991, Casper et al. (withdrawn)

*Primary Examiner* — David H Bollinger
(74) *Attorney, Agent, or Firm* — IP Law Leaders PLLC

(57) ABSTRACT

A multi-appliance power unit (100) selectively driving one of a plurality of power driven appliances (114) from one relocatable power plant (102). The modular power plant (102) is entrapped on a platform (108) and is movable therealong to any one of the appliances (114) fastened to the platform (108), which appliance (114) can then be driven by the power plant (102). A modular power plant and power driven appliance kit (200) includes a wheeled chassis (204) having a handle (220), a removable modular power plant (202 or 212), and a removable modular power driven appliance (212 or 202). A flexible drive shaft (300), is optionally integrated with a power plant or a powered appliance. The flexible drive shaft (300) includes an outer flexible sheath (310), roller type bearings (308), and a multifilament torque conducting flexible core (306) held spaced apart from the outer flexible sheath (310) by the bearings (308).

18 Claims, 7 Drawing Sheets

(51) Int. Cl.
*F16D 1/10* (2006.01)
*F16H 7/02* (2006.01)
*F16H 7/18* (2006.01)
*F16M 3/00* (2006.01)
*F16D 1/08* (2006.01)
*F16H 21/04* (2006.01)
*F16H 21/44* (2006.01)
*F16C 1/28* (2006.01)
*F16H 9/26* (2006.01)
*F16H 35/18* (2006.01)

(56) References Cited

U.S. PATENT DOCUMENTS

| | | |
|---|---|---|
| 2,778,233 A | 1/1957 | Perry |
| 3,040,590 A | 6/1962 | Smithburn |
| 3,941,002 A | 3/1976 | Tucker, Jr. |
| 4,597,203 A | 7/1986 | Middleton |
| 4,615,117 A | 10/1986 | Flath |
| 4,757,786 A | 7/1988 | Ellegard |
| 5,095,259 A | 3/1992 | Bailey et al. |
| 5,449,140 A | 9/1995 | Lastowskit |
| 5,526,708 A | 6/1996 | Hill |
| 5,901,605 A | 5/1999 | Oosterhuis et al. |
| 5,907,970 A | 6/1999 | Havlovick et al. |
| 6,266,949 B1 | 7/2001 | Eavenson et al. |
| 6,922,981 B1 | 8/2005 | Tyree |
| 7,007,659 B2 | 3/2006 | Chittenden |
| 7,382,104 B2 | 6/2008 | Jacobson et al. |
| 7,621,194 B1 | 11/2009 | Tyree |
| 2011/0155888 A1 | 6/2011 | Jordahl |
| 2013/0305851 A1 | 11/2013 | Rees et al. |

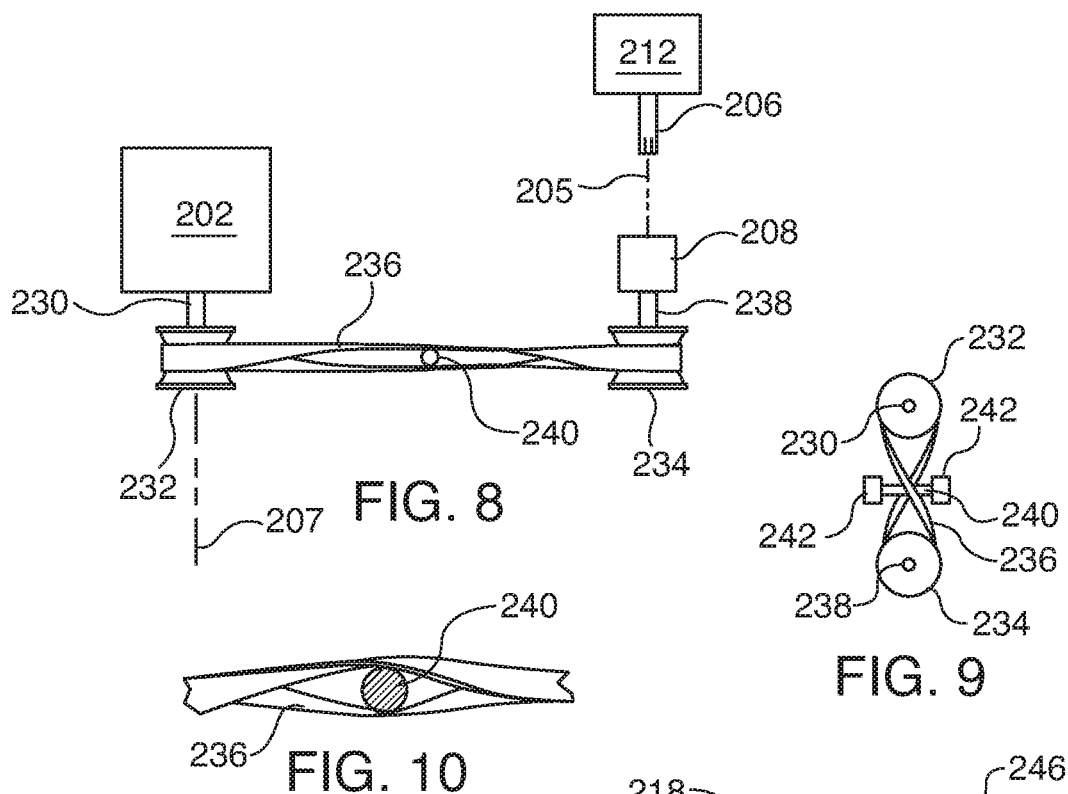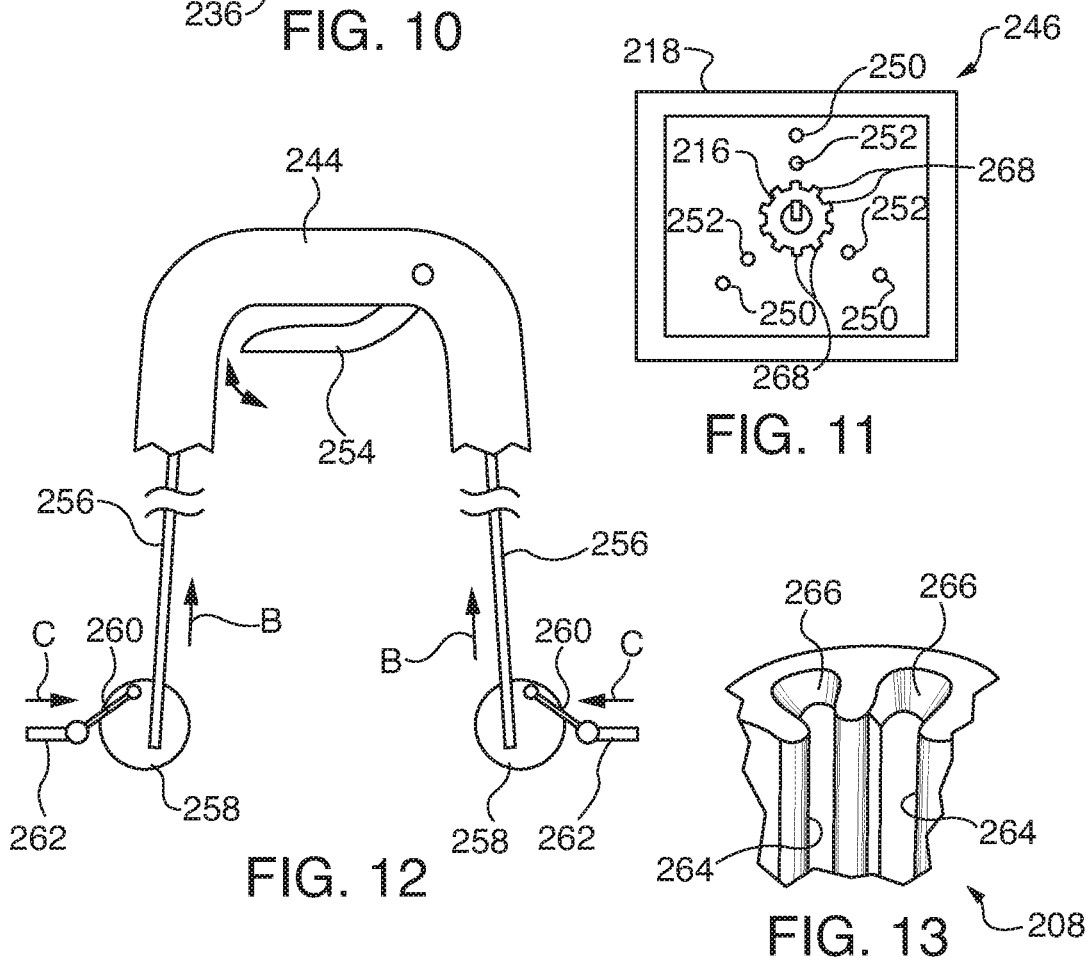

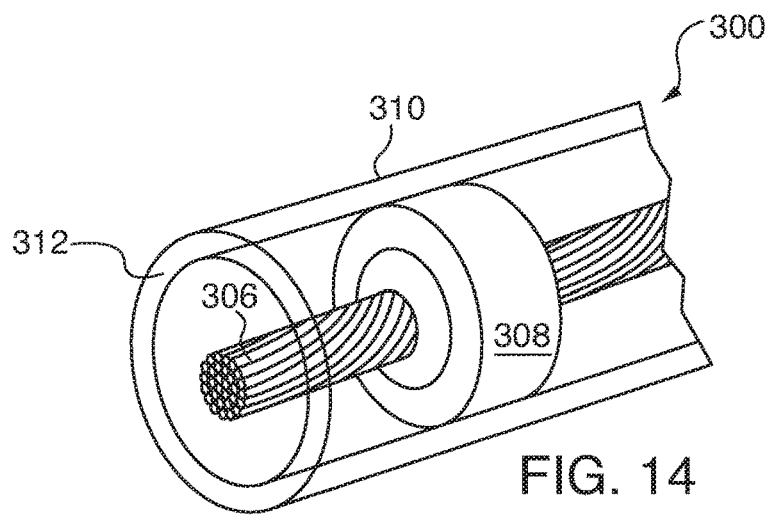
FIG. 14
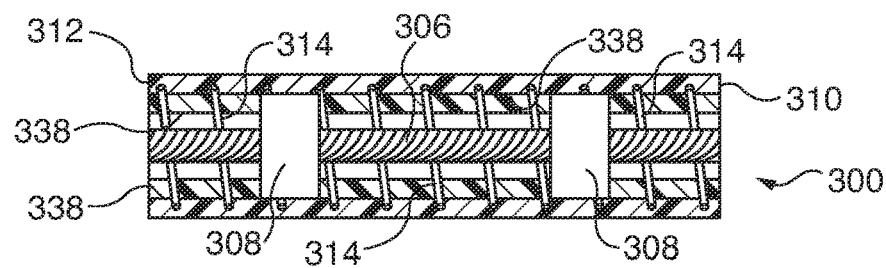
FIG. 15
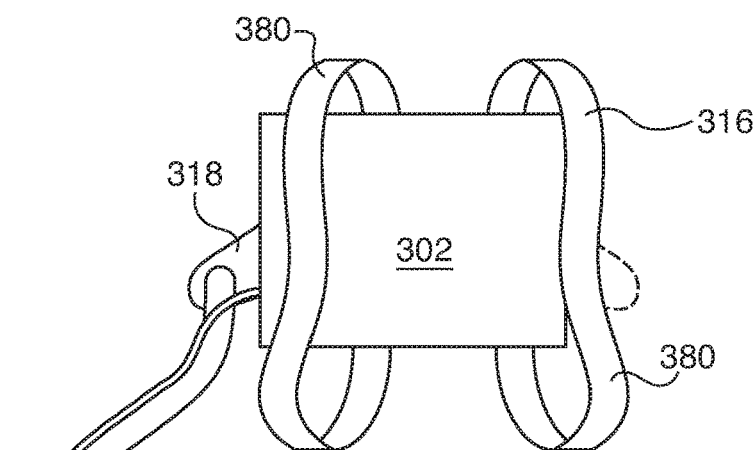
FIG. 16
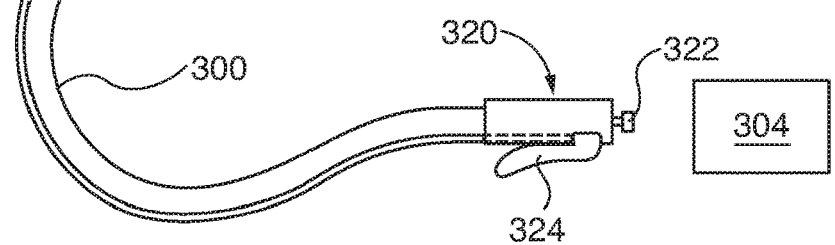

MULTI-APPLICATION POWER UNIT FOR DRIVING PLURAL APPLIANCES

REFERENCE TO RELATED APPLICATIONS

The present application claims priority under 35 U.S.C. § 119(e) to U.S. Provisional Patent Application Ser. No. 62/184,722, filed Jun. 25, 2015, the entire contents of which are expressly incorporated herein by reference.

TECHNICAL FIELD

The present disclosure relates to power driven appliances, and more particularly, to torque transmission, via a flexible drive shaft, from relocatable power sources to a plurality of power driven appliances, and to mechanical/functional connections of modular, removable appliances to power sources.

BACKGROUND ART

A great many appliances such as hand held tools and portable equipment such as generators, pumps, and the like, are motor driven, either by electric motors or by internal combustion engines. In many cases, each powered appliance is commercially provided with its own dedicated power plant and/or source (for example, electric motor or internal combustion engine). Consequently, capital costs, bulk, and weight of the many appliances may be maximized. Logical physical layout of the many appliances is often difficult to achieve.

Modular appliances having removable and replaceable power plants have been proposed. However, these frequently require tedious assembly such as installation of threaded fasteners and the like, often not lending themselves to a logical physical layout facilitating moving workpieces from one appliance to another.

There remains a need for more practical ways of establishing mechanical and/or functional connections of appliances to their respective power plants/sources, for improving replaceability of power plants/sources and power driven appliances, and for making power/source plant-appliance combinations more compact and versatile.

SUMMARY OF EMBODIMENTS

The present disclosure addresses the above stated situation by providing a multi-application power unit for selectively driving a plurality of power driven appliances from one or more power plants/sources (hereinafter "power plant"). The power driven appliances are mounted to a platform, for example, and selectively coupled to a power plant. The power plant rolls or slides along the platform into engagement with a selected power driven appliance. Thus, one power plant can be used to power a plurality of appliances, and can be expeditiously connected to a different appliance. This arrangement enables a compact work station to be constructed, wherein a number of different tasks can be accomplished by the several appliances. Also, capital costs, weight, bulk, and need for replacement parts are all minimized. It is an object of the disclosure to provide improved elements and arrangements thereof by apparatus for the purposes described which is inexpensive, dependable, and fully effective in accomplishing its intended purposes.

The present disclosure further addresses the above stated situation by providing a multi-application power unit for selectively driving a plurality of power driven appliances, which may also comprise a plurality of power driven appliances. A modular power plant and power driven appliance system enables a power driven appliance to be removably positioned in a drive position, the latter enabling the power driven appliance to be driven by a power plant. A flexible drive shaft for transmitting torque from a power plant to a power driven appliance is disclosed. A power device including a flexible drive shaft comprises a power associated apparatus and a flexible drive shaft connected thereto. It is an object of the disclosure to provide improved elements and arrangements thereof by apparatus for the purposes described which is inexpensive, dependable, and fully effective in accomplishing its intended purposes.

The present disclosure also addresses the above stated situation by providing a flexible drive shaft for transmitting torque from a power plant to a power driven appliance. The power driven appliance may be modular, or readily decoupled from the power plant, or alternatively, may be permanently coupled to the power plant, with the flexible drive shaft serially connecting the appliance and the power plant. A power device including a flexible drive shaft comprises a power associated apparatus, which may be the power plant, the appliance, or both, and the flexible drive shaft connected thereto. A feature of the flexible driveshaft is incorporation of an internal stiffener embedded within the outer wall of the flexible driveshaft. This feature opposes kinking which would otherwise be possible as bending is incorporated into the layout of the flexible driveshaft. It is an object of the disclosure to provide improved elements and arrangements thereof by apparatus for the purposes described which is inexpensive, dependable, and fully effective in accomplishing its intended purposes.

These and other objects of the present disclosure will become readily apparent upon further review of the following specification and drawings.

BRIEF DESCRIPTION OF DRAWINGS

Various objects, features, and attendant advantages of the present disclosure will become more fully appreciated as the same becomes better understood when considered in conjunction with the accompanying drawings, in which like reference characters designate the same or similar parts throughout the several views, and wherein:

FIG. 8 is a schematic side view of elements concealed in FIG. 7, according to at least one aspect of the disclosure;

FIG. 9 is a schematic bottom view of elements shown in FIG. 8, according to at least one aspect of the invention;

FIG. 10 is an enlarged side detail view of the center of FIG. 8;

FIG. 11 is a schematic bottom view of a component such as the component seen at the right of FIG. 7, according to at least one aspect of the disclosure;

FIG. 12 is a schematic side detail view of an optional feature associated with handles shown in FIG. 7, drawn to enlarged scale, according to at least one aspect of the disclosure;

FIG. 13 is a schematic perspective detail view of a component seen at the lower center of FIG. 7;

FIG. 14 is a schematic perspective detail view of a flexible drive shaft, according to at least one aspect of the disclosure;

FIG. 15 is a schematic side cross sectional view of the flexible drive shaft of FIG. 14;

FIG. 16 is a schematic front view of a body worn appliance utilizing the flexible drive shaft of FIG. 14, according to at least one aspect of the disclosure;

DETAILED DESCRIPTION

Figure 1:
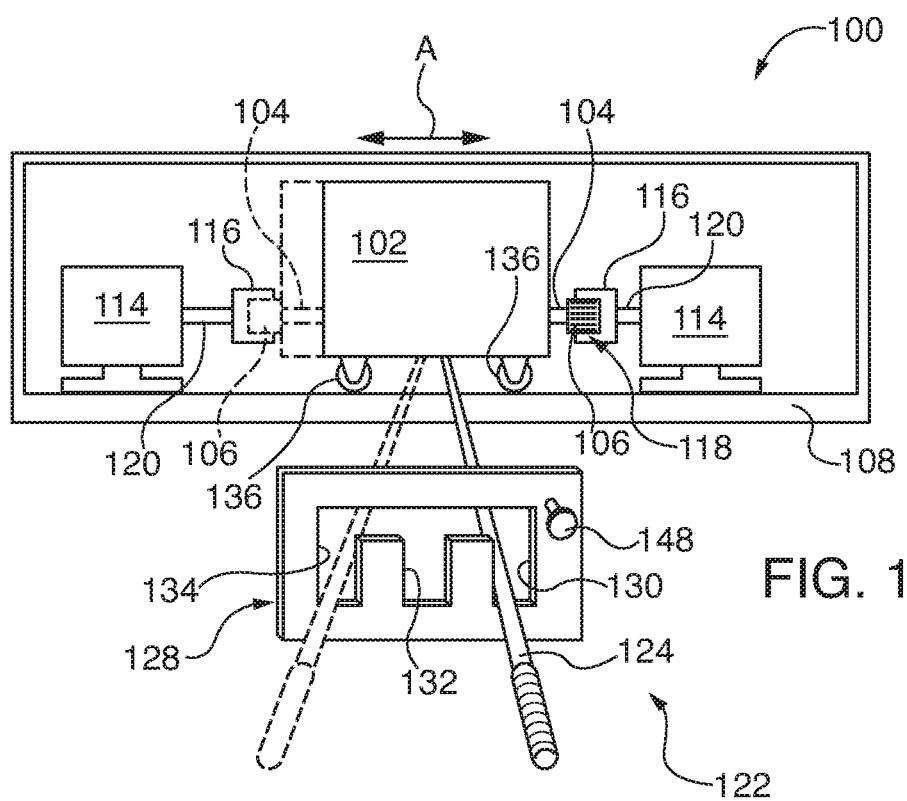
FIG. 1 is a schematic side view of a multi-application power unit 100 for selectively driving a plurality of power driven appliances, according to at least one aspect of the disclosure.
Figure 2:
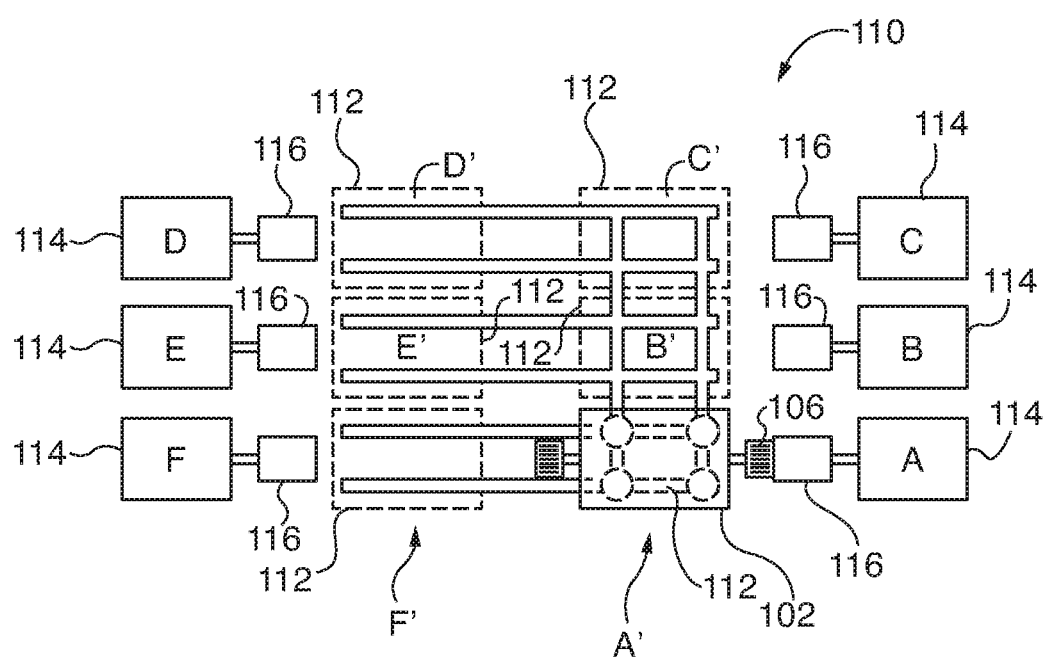
FIG. 2 is a schematic top plan view of a positioning scheme throughout which the multi-application power unit of FIG. 1 may be maneuvered, according to at least one aspect of the disclosure.

Referring first to FIGS. 1 and 2, according to at least one aspect of the disclosure, there is shown a multi-application power unit 100 for selectively driving a plurality of power driven appliances 114. Multi-application power unit 100 comprises at least one power plant 102 including an output shaft 104 including a power connection element 106, a plurality of power driven appliances 114, and a platform 108 including a variable position power plant engagement securing power plant 102 to platform 108 and enabling power plant 102 to be moved among a plurality of selectable power plant positions 112 each enabling coupling of power connection element 106 of power plant 102 to at least one of the plurality of power driven appliances 114 when the at least one power driven appliance 114 is coupled to platform 108 proximate a selectable power plant position 112. Each power plant position 112 includes a coupling retaining a power driven appliance 114 to platform 108.

In summary, a plurality of power driven appliances 114 may be mounted to platform 108, while power plant 102 is movable from one power driven appliance 114 to another. Moving power plant 102 into a selectable power plant position causes torque transfer to an engaged power driven appliance 114, as will be described hereinafter.

The variable position power plant engagement may comprise a track system 110 entrapping the at least one power plant 102 by interference fit. Track system 110 may comprise a plurality of channels 115 along which power plant 102 may slide as it is moved from one selectable power plant position 112 to another.

Continuing to refer to FIGS. 1 and 2, track system 110 may comprise channels 115 recessed into platform 108. Each of channels 115 constrains power plant 102 to move among selectable power plant positions 112 along predetermined paths. The predetermined paths effect torque transferring mutual engagement between power plant 102 and a selected power driven appliance 114.

Referring specifically to FIG. 1, the variable position power plant engagement may comprise a rail 125 fixed to platform 108, and power plant 102 may comprise rollers dimensioned and configured to roll along rail 125. As used herein, rollers encompass disc-like wheels 136, spherical wheels, and other shaped rolling elements. Wheels 136 may be advantageous where for example power plant 102 is relatively heavy.

The variable position power plant engagement may comprise a turntable (not shown), to which power plant 102 is rotatably fixed. Rotation causes power plant 102 to present its associated power connection element 106 to be accessible at a new or different selectable power plant position 112, for connection to a different power driven appliance 114. This situation would apply where platform 108 is relatively small compared to e.g. FIGS. 1 and 2. For example, platform 108 could be circular or nearly so, with a radius about equal to the reach of output shaft 104. In this way, power plant 102 could rotate, but not translate relative to platform 108, while still presenting output shaft 104 in locations serving different power driven appliances 114.

Each selectable power plant position 112 (called out in FIG. 2 as A', B', C', D', E', or F') corresponds to one of power driven appliances 114 such that when moved to a selectable power plant position 112, power plant 102 drivably engages a respective one of power driven appliances 114 (also called out in FIG. 2 as A, B, C, D, E, or F).

Power connection element 106 is an element non-circular in cross section through a rotational axis of output shaft 104, which can engage and drive a corresponding non-circular power connection element. In the example of FIG. 1, and referring also to FIG. 3, power connection element 106 has outwardly projecting splines or teeth 118 which engage grooves (not shown) of e.g. a splined socket 116.

Platform 108 is a structural member for supporting power plant 102, power driven appliances 114, and other apparatus for operating multi-application unit 100. Platform 108 may or may not have a flat upper surface, for example, comprising an open frame (not shown).

Power driven appliances 114 may include any tool or other device for performing useful work, which requires movement under power to function. Examples include AC and DC generators, high volume, low pressure pumps such as irrigation pumps, low volume, high pressure pumps such as pressure washer pumps, hydraulic pumps, other pumps, vacuum pumps, air compressors, cutting appliances such as table or bench saws, grinders, and illumination units including both generator and also lighting elements, among others.

Multi-application power unit 100 may further comprise a plurality of power driven appliances 114 removably attachable to and coupled to platform 108. Each one of the plurality of power driven appliances 114 is located proximate one of the plurality of selectable power plant positions 112 such that power plant 102 can be moved into drivable engagement with any one of power driven appliances 114 when the one power driven appliance 114 is coupled to platform 108 at one of selectable power plant positions 112.

In track system 110, channels 115 may be arrayed orthogonally. This results in a compact array of selectable power plant positions 112 for a platform 108 of any given size.

As depicted in FIG. 2, channels 115 include at least two parallel paths in a first direction and at least one path spanning the at least two parallel paths. As used herein, a path is a whole or partial straight channels 115. This described arrangement enables transfer of power plant 102 from a first selectable power plant position 112 to a second selectable power plant position immediately adjacent to the first selectable power plant position. This may prove advantageous where it is desirable to locate two power driven appliances 114 next to one another on one edge of platform 108. For example, a grinder (not shown) may be located immediately adjacent to a wire wheel for smoothing ground edges. Proximity of these two expedites a finished grinding and smoothing operation being performed on a workpiece.

The at least two parallel paths may comprise three parallel paths. As shown in FIG. 2, this arrangement enables a compact array of power driven appliances 114, while enabling expeditious linear movement of power plant 102 between one power driven appliance 114 and an opposed power driven appliance 114, this applying to three pairs of opposed power driven appliances 114.

Referring particularly to FIG. 1, multi-application power unit 100 may further comprise a manual mover 122 capable of moving the power plant 102 to one of the plurality of selectable power plant positions 112. Manual mover 122 enables a person to move power plant 102 to the right or left (seen as arrow A in FIG. 1) into drivable engagement with one power driven appliance 114 or another. Manual mover 122 facilitates movement of power plant 102, which power plant 102 may be heavy or difficult to move manually due to other characteristics such as presence of projections (not shown).

Figure 5:
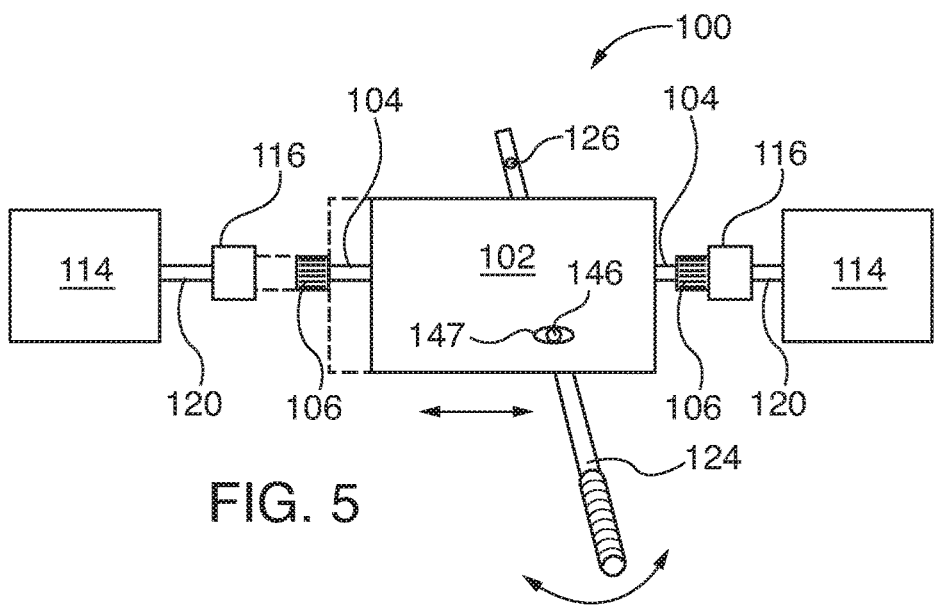
FIG. 5 is a schematic top view showing a variant of FIG. 1.

Manual mover 122 may comprises a lever 124 movable to at least two active positions, wherein in each of the at least two active positions, lever 124 has moved power plant 102 to coupling proximity to one power driven appliance 114 when power driven appliance 114 has been fastened to platform 108 at a selectable power plant position 112. Lever 124 facilitates one handed movement of power plant 102 from one location to another. Lever 124 may terminate in a yoke (not shown) which engages a pin (e.g., corresponding to pin 146 in FIG. 5) on power plant 102. FIG. 5 shows a variation of FIG. 1, wherein pin 126 (anchored to platform 108, not shown in FIG. 5) and a pin 146 fixed to lever 124 and engaging an opening in power plant 102 have exchanged places from corresponding positions of FIG. 1.

Manual mover 122 may comprise a gate assembly 128 having at least two end slots 130, 134 dimensioned and configured to receive lever 124 and to constrain lever 124 to move along a travel path wherein lever 124 can move power plant 102 selectively to one of the active positions at one end slot 130 or 134 and to a second one of the active positions at the other end slot 134 or 130. Constraining the travel path of the lever allows a user to move power plant 102 with less concentration, and assures that power plant 102 will be moved where intended.

As an alternative to manual mover 122, for example for use in environments wherein power plant 102 is not readily accessible, position of power plant 102 relative to power driven appliance 114 may be managed remotely, such as by a hydraulic actuator (not shown).

In track system 110, each of the at least two active positions may be linearly opposed to another of the at least two positions, whereby power plant 102 can be connected selectively to two power driven appliances 114 by linear motion. This is both easier for a user, and also reduces likelihood of lever related components from wearing and becoming susceptible to misalignments over time.

Referring specifically to FIG. 1, multi-application power unit 100 may further comprise a power plant controller 148 operably mounted to gate assembly 128 and connected to power plant 102. Illustratively, power plant controller 148 could be a throttle control connected to a carburetor of an internal combustion engine (not shown). Locating power plant controller 148 proximate lever 124 introduces a convenience in operating multi-application power unit 100 in that clustered controls are more easily used than separated controls.

Gate assembly 128 may include an intermediate slot 132 between two end slots 130, 134, wherein moving lever 124 to occupy intermediate slot 132 moves power plant 102 to a neutral position wherein no power driven appliances 114 will be engaged. This permits power plant 102 to remain running even when operation of a power driven appliance is not desired.

Figure 23:
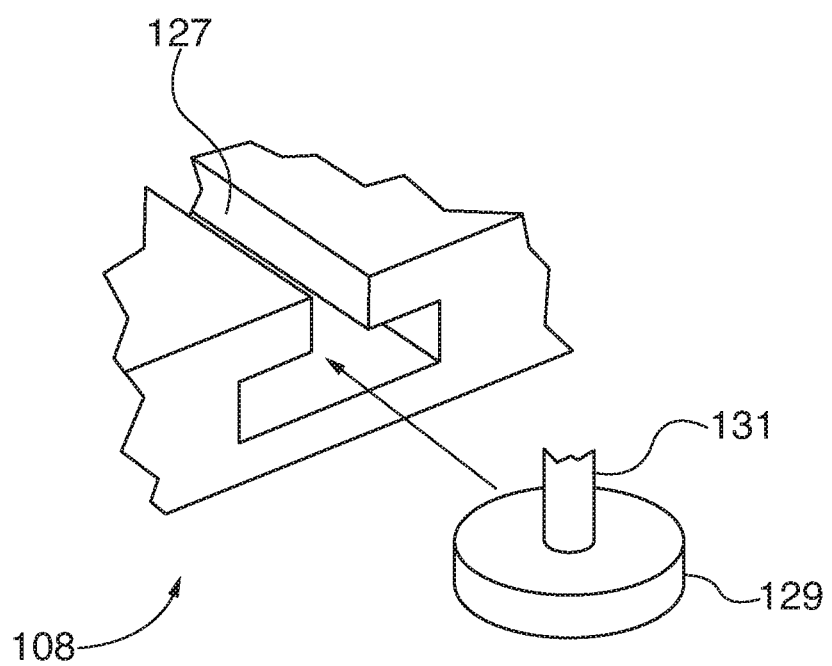
FIG. 23 is a perspective detail view of a support and guide feature which is an alternative to wheels shown at the center of FIGS. 1 and 6.

Turning now to FIG. 23, as an alternative to wheels 136 and rails 125, track system 110 may comprise grooves (e.g., groove 127), and power plant 102 may have feet 129 slidable along grooves 127. In the example of FIG. 23, groove 127 is T-shaped, and accepts a T-shaped object or assembly such as disc-like foot 129 fixed to a leg 131. The assembly of foot 129 and leg 131 may fit in close cooperation within groove 127, so that there is little likelihood of power plant 102 cocking relative to groove 127 and hanging up as it is moved to a new selectable power plant position 112.

As shown in FIGS. 1, 2, 5, and 6, multi-application power unit 100 may further comprise a slidable engagement coupling power connection element 106 of power plant 102 to one power driven appliance 114. The slidable engagement coupling may include a splined shaft (e.g., input shaft 120) on one of power plant 102 and power driven appliance 114 and a splined socket 116 on the other one of power plant 102 and power driven appliance 114. Splined socket 116 may comprise a beveled portion (not shown in FIGS. 1, 2, 5, and 6, but similar to beveled portion 266 illustrated in FIG. 13) configured to guide the splined shaft into concentric driving engagement therewith. A splined shaft and a splined socket are relatively easily brought into mutual driving engagement by the above arrangement.

Figure 3:
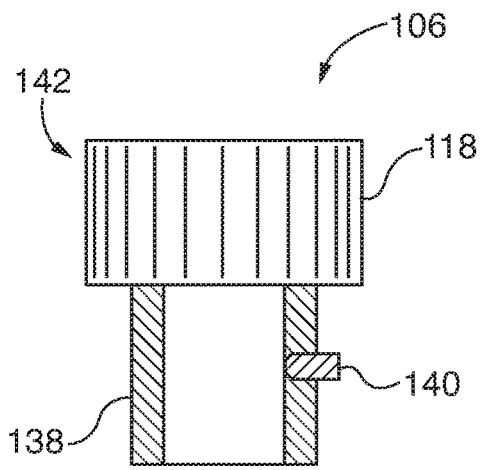
FIG. 3 is a schematic side detail view of a component seen at the center right of FIG. 1.
Figure 4:
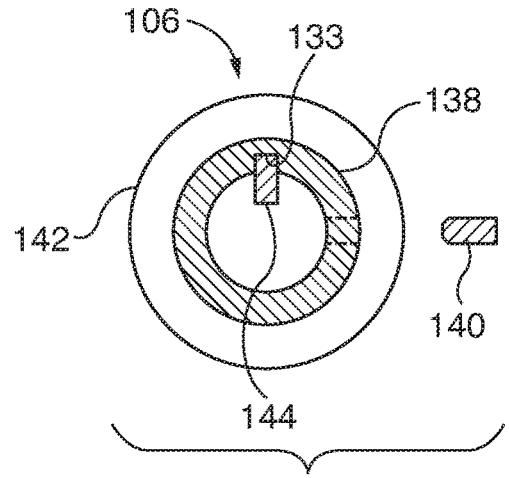
FIG. 4 is a schematic end view of a variant of the component of FIG. 3.

Also referring to FIGS. 3 and 4, where a splined shaft is not provided, multi-application power unit 100 may further comprise a slidable engagement coupling the power connection element 106 (FIGS. 1, 2, 5, and 6) of power plant 102 to at least one of a plurality of power driven appliances 114, wherein one of power plant 102 and power driven appliances 114 comprises splined socket 116 and the other one of power plant 102 and power driven appliances 114 comprises an unsplined shaft (e.g., output shaft 104 shown in FIGS. 1, 5, and 6) having a first keyway (not shown, but similar to keyway 133 of FIG. 4) and a splined head 142 (FIG. 3) removably attachable to the unsplined shaft. Splined head 142 may comprise a collar 138 (FIG. 4) fixed thereto. Collar 138 may comprise a second keyway 133, a key 144 matingly compatible with first keyway 133 and the second keyway, and a setscrew 140 for engaging the unsplined shaft. This arrangement enables use of splines with an unsplined shaft.

Figure 6:
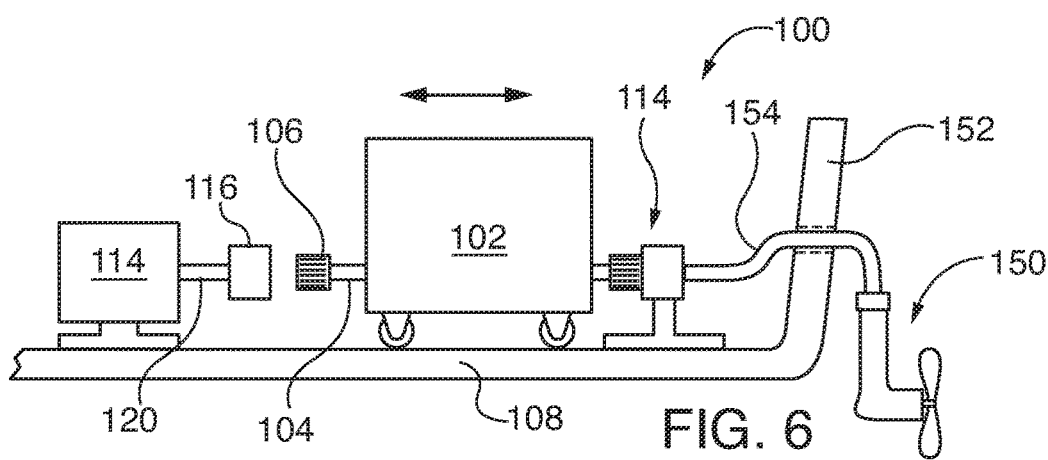
FIG. 6 is a schematic side view of a multi-application power unit, according to at least one aspect of the disclosure.

Referring also to FIG. 6, in an exemplary use, multi-application unit 100 may be used to power a boat (not shown in its entirety). Power plant 102 may be arranged to operate a stern drive 150 mounted to a transom 152 of the boat. A flexible drive shaft 154 may be interposed between power plant 102 and stern drive 150. As depicted in FIG. 6, power driven appliance 114 comprises a splined socket 116 anchored to the boat. Flexible driveshaft 154 receives torque from splined socket 116, and transmits the torque to stern drive 150.

Where used with boats, multi-application unit 100 may be used to selectively drive for example a generator or a limited duty motor, such as a trolling motor or standby or spare motor.

Multi-application power unit 100 may be utilized as a stationary device, such as a free standing work station, with or without legs, which is used in one location, or which may be integrated into a building or other premise. Alternatively, multi-application power unit 100 may be mobile, for example having wheels, such as being a wheeled trailer with a hitch (not shown). Multi-application power unit 100 may be integrated into an aircraft or a water craft, either permanently fixed, or alternatively, removably installed.

In production models of multi-application power unit 100, power connection element 106 and splined socket 116 would be covered by guards (not shown).

Figure 7:
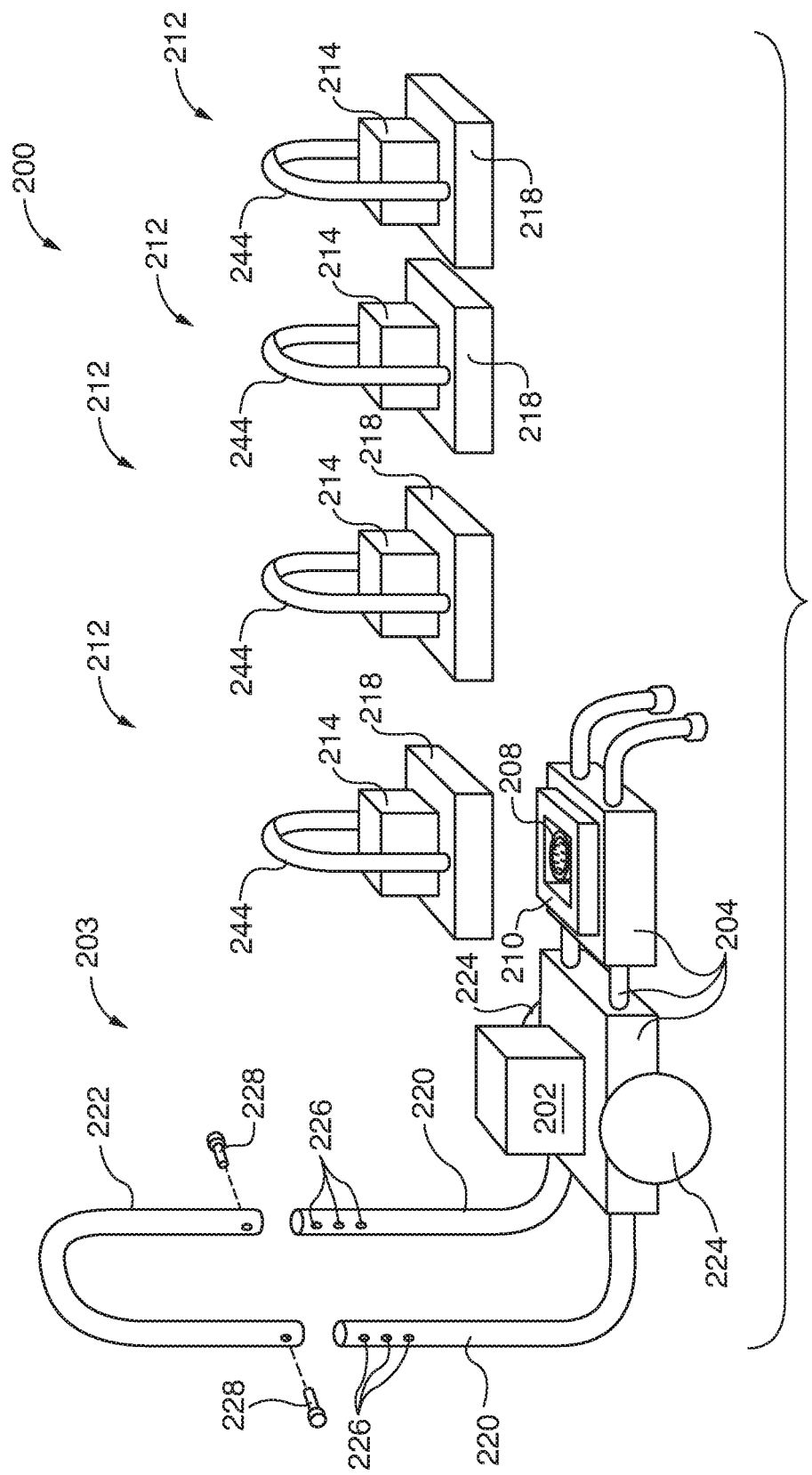
FIG. 7 is a schematic exploded perspective view of a modular power plant and power driven appliance system, according to at least one aspect of the disclosure.

As shown in FIG. 7, a plurality of power associated modules (e.g., second modular unit 212) are selectively connected to a chassis 204, where they are connected to power from a power associated module 202. In the example of FIG. 7, power associated module 202 is a power plant, and may be an internal combustion engine, electric motor, pneumatic motor, hydraulic motor, or spring motor for example. In the example of FIG. 7, power associated module 212 is a power driven appliance, and may include any tool or other device for performing useful work, which requires movement under power to function. Examples include AC and DC generators, high volume, low pressure pumps such as irrigation pumps, low volume, high pressure pumps such as pressure washer pumps, hydraulic pumps, other pumps, vacuum pumps, air compressors, cutting appliances such as table or bench saws, grinders, and illumination units including both generator and also lighting elements, among others.

Both the power plant and also the power driven appliance may be modular, and may be freely exchanged for other power plants and power driven appliances.

Referring to FIGS. 7-13, a modular power plant and power driven appliance kit 200 comprises a chassis 204 including a first torque transfer element (e.g., a rotatable shaft 238, shown in FIG. 8) and a second torque transfer element (e.g., another rotatable shaft) drivably connected to the first torque transfer element 238. A first connector (e.g., wall 210, FIG. 7) at first torque transfer element 238 releasably couples a separable power associated module to first torque transfer element 238. A second connector (not shown but similar to e.g. wall 210, shown in FIG. 7) at second torque transfer element 230 releasably couples another separable power associated module to second torque transfer element 230.

A first power associated module 212 is manually securable to and releasable from a first torque transfer connector (e.g., socket 208) of first torque transfer element 238, wherein first power associated module 212 comprises one of a power plant and a power driven appliance. A second power associated module 202 is manually securable to a torque transfer connector (e.g., socket 208) of second torque transfer element 230. Second power associated module 202 comprises another one of a power plant and a power driven appliance. That is, for modular power plant and power driven appliance kit 200 to be useful, it must have one power plant and one power driven appliance.

It will be appreciated that the first and second connectors align the power associated module relative to chassis 204, and also support the weight thereof, even under dynamic conditions of use. Alignment is important because of the necessity of aligning rotating torque transmission components.

First support 210 and second support 218 have been illustrated as rectangular. However, in some embodiments, first support and second support 218 may have other configurations, such as octagonal, circular, and others. Support wall 210 and corresponding support wall 218 of first power associated module 212 are configured to enable first power associated module 212 to be indexably coupled to chassis 204. This feature enables a great many indexable positions of a power driven appliance (shown as modular unit 212 in FIG. 7) relative to first support wall 210, such as eight, ten, twelve, and odd numbers, among others. First support wall 210 and the second support wall 218 nestingly interfit one another in close cooperation. Walls 210, 218 align and support a power associated module on chassis 204, but do not necessarily latch the two together. Many appliances can be safely and effectively operated by gravity retention of modular units 212.

Unless otherwise indicated, the terms "first", "second", etc., are used herein merely as labels, and are not intended to impose ordinal, positional, or hierarchical requirements on the times to which these terms refer. Moreover, reference to, e.g., a "second" item does not either require or preclude the existence of, e.g., a "first" or lower-numbered item, and/or, e.g., a "third" or higher-numbered item.

Modular power plant and power driven appliance kit 200 may further comprise at least two wheels 224 rotatably coupled to chassis 204, to enable chassis 204 to be rolled along a ground surface (not shown), and a handle 220 coupled to chassis 204. Handle 220 is configured to enable maneuvering chassis 204 along the ground by hand. In the example of FIG. 7, chassis 204 supports two wheels 224, and has two legs for stability. In this example, chassis 204 is wheeled about with the legs above the ground.

The first connector (e.g., wall 210) is dimensioned and configured to hold first power associated module 212 in torque transfer relation to first torque transfer element 238, and to enable sliding engagement of first power associated module 212 with first torque transfer element 238. In the example of FIG. 8, first torque transfer element 238 is a rotatable shaft coupled to splined socket 208. The same torque transmission components may be used with regard to second torque transfer element 230 at the left of first torque transfer element 238 in FIG. 8.

It should be noted at this point that orientational terms such as above, over, and below, etc., refer to the subject drawing as viewed by an observer. The drawing figures depict their subject matter in orientations of normal use, which could obviously change with changes in body posture of the user and position of depicted apparatus. Therefore, orientational terms must be understood to provide semantic basis for purposes of description only, and do not imply that their subject matter can be used only in one position.

The first connector further comprises a first support wall 210 capable of supporting the first power associated module 212 on the chassis 204 in an operable position under operating conditions. An operating position is a position in which torque is operably connected between the power associated modules actually installed on and used with modular power plant and power driven appliance kit 200.

Under operating conditions, the powered appliance is driven by torque from the power plant.

The modular power plant and power driven appliance kit 200 may further comprise a second support wall (not shown, but similar to first support wall 210) capable of supporting the second power associated module 202 on the chassis 204 in the operable position under operating conditions, and a transmission (232, 234, 236, seen in FIG. 8) enabling transfer of torque between the first torque transfer element 238 and the second torque transfer element 230 when the first power associated module 212 and the second power associated module 202 have been placed in the drive position. Provision of the second support wall, together with use of similar sockets 208 on respective rotatable shafts 230, 238, enable both the power plant and also the power driven appliance to be readily interchangeable, although this is not necessary. For example, one power plant or one power driven appliance could be bolted to chassis 204 if it is contemplated that it will be used exclusively or almost exclusively.

Referring particularly to FIGS. 8-10, the transmission comprises a first pulley 234 on first torque transfer element 238, a second pulley 232 on second torque transfer element 230, and a drive belt 236 drivably seated on first pulley 234 and second pulley 232. In the example of FIGS. 8-10, drive belt 236 crosses itself and reverses direction of rotation of first pulley 234 relative to second pulley 232. Drive belt 236 is protected from damage which might otherwise occur due to contact of sections of drive belt 236 moving in opposing direction by a rotatable rod 240 intervening between and separating potentially mutually contacting sections of the drive belt 236 where the drive belt 236 crosses itself.

To accommodate more power, the arrangement using drive belt 236 may be replaced by a system employing intermeshing gears (not shown).

In the modular power plant and power driven appliance kit 200, the first connector (e.g., support wall 210) and the second connector (e.g., another wall 210) are configured to engage respectively first power associated module 212 directly above the first torque transfer element (e.g., socket 208) and second power associated module 202 directly above the second torque transfer element (e.g., the other socket 208) when the modular power plant and power driven appliance kit 200 is in an operable position. Also, first torque transfer element 238 has a vertical rotational axis 205 and the second torque transfer element 230 has a vertical rotational axis 207 when modular power plant and power driven appliance kit 200 is in the operable position. This relationship enables both the power plant and also the power driven appliance to be lowered onto chassis 204 and immediately become both stably supported and also suitably connected to torque transferring components.

Modular power plant and power driven appliance kit 200 is in the operable position when wheels 224 of chassis 204 contact the ground from thereabove. First power associated module 212 has a vertical rotational axis 205 and second power associated module 202 has a vertical rotational axis 207 when engaging the respective first torque transfer element and the second torque transfer element (e.g., sockets 208). Vertical rotational axes 205, 207 enable both the power plant and also the power driven appliance to be lowered onto chassis 204, when chassis 204 is in a position to be wheeled along the ground.

Referring also to FIG. 13, first power associated module 212 comprises a splined shaft 206 (see FIG. 8) configured to transfer torque between the first power associated module 212 and the first torque transfer element (e.g., socket 208), and the second power associated module 202 comprises a splined shaft (not shown but similar to splined shaft 206) configured to transfer torque between the second power associated module 202 and the second torque transfer element (e.g., one of the sockets 208). First torque transfer element 238 comprises a splined socket 208 including a beveled portion 266 configured to guide splined shaft 206 of first power associated module 212 into concentric driving engagement therewith. Beveled portion 266 is dimensioned and configured to receive splines (e.g., splines 268 in FIG. 11) of a second power connector element 216, and guide the splines into grooves 264. Funnel-like beveled portion 266 enables successful mating of the splined shaft of the power associated module 202 or 212 merely by lowering power associated module 202 or 212 down onto and into engagement with socket 208 and first torque transfer element 238.

When lowering a power associated module 202 or 212 into engagement with socket 208, power associated module 202 or 212 is held in appropriate alignment by telescoping fit of complementing support components. To this end, modular power plant and power driven appliance kit 200 further comprises a second support (e.g., wall 218, FIG. 7) fixed to the power driven appliance, wherein the second support 218 is dimensioned and configured to slidably engage the first support 210. First support 210 engages second support 218 and enables operation of the power driven appliance (e.g., first power associated module 212) under power from the power plant (e.g., second power associated module 202) when the first power associated module is placed in the drive position.

Stability of a power associated module 202 or 212 may rely on gravity if walls 201, 218 overlap one another sufficiently. Alternatively, and referring now to FIG. 12, modular power plant and power driven appliance kit 200 may further comprise an automatic latch feature operable to latch at least one of first power associated module 212 and second power associated module 202 to chassis 204. First power associated modular unit 212 and second power associated modular unit 202 may each include a latch releasably latching first or second power associated modular unit 202 or 212 to wall 210 when first or second power associated modular unit 212 or 202 is grasped by handle 244, maneuvered into drivable engagement with wall 210, and handle 244 is released from grasp.

To this end, handle 244 incorporates a pivotally mounted control lever 254. No conscious effort is required of the user to operate control lever 254, as the latter is located at the bottom of that portion of handle 244 which is ordinary grasped by the user when lifting first or second power associated module 212 or 202. Grasping handle 244 pivots control lever 254, which pulls on a cable 256. In turn, pulling on cable in the direction indicated as direction B turns a wheel 258. A connecting rod 260 responsively pulls on a latch pin 262 in a direction C, withdrawing latch pin 262 from a hole (not shown) in wall 210. First or second power associated modular unit 212 or 202 may then be pulled free from wall 210. Two cables 256 and associated components are depicted in FIG. 12.

In the above latching arrangement, at least one of first power associated module 212 and second power associated module 202 comprises handle 244 for lifting. The latch is mostly contained within handle 244. That is, only control lever 254 and latch pins 262 protrude from handle 244, with the remaining linkage components being contained within handle 244.

Referring particularly to FIG. 11, modular power plant and power driven appliance kit 200 may further comprise an adjustment feature selectively enabling support walls (e.g., support wall 210) of different dimensions to be used with chassis 104. Support wall 218 is part of a support assembly 246 adapted to receive different appliances. Illustratively, holes 250 may be used to fasten one appliance to support assembly 246, while holes 252 are used to fasten a smaller appliance to support assembly 246.

Referring now initially to FIGS. 14 and 15, there is shown a flexible drive shaft 300 for transmitting torque from a power plant 302 to a power driven appliance 304. Flexible drive shaft 300 comprises an elongated flexible core 306, and a plurality of bearings 308 each including complementary bearing races (not shown) and rolling bearing elements (see FIGS. 18-20) within the complementary bearing races, wherein each bearing 308 is spaced apart from every adjacent bearing 308. A flexible tubular sheath 310 encloses elongated flexible core 306 and the plurality of bearings 308, flexible tubular sheath 310 contacting each outmost one of the complementary bearing races of the plurality of bearings 308 and avoiding contact with elongated flexible core 306. Flexible tubular sheath 310 includes a flexible annular wall 312 and an internal stiffener 314 embedded within flexible annular wall 312 and contained within inner and outer surfaces of flexible annular wall 312. Internal stiffener 314 is omitted from FIG. 14 for clarity of the view, but is shown in FIG. 15.

Elongated flexible core 306 may comprise stranded metallic filaments.

Figure 18:
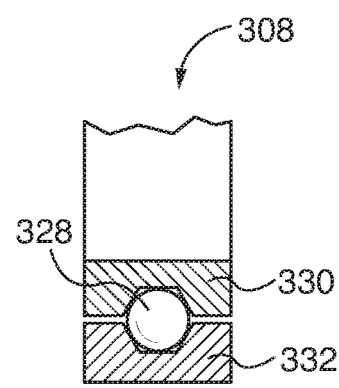
FIG. 18 is a partially cross sectional detail view of a bearing of the flexible drive shaft of FIG. 14.
Figure 19:
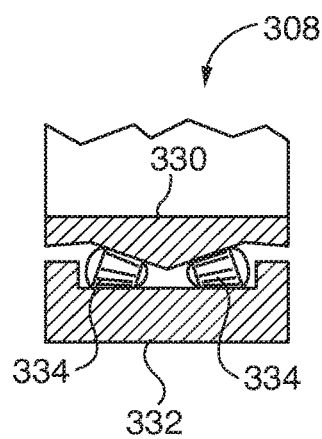
FIG. 19 is a partially cross sectional detail view of another bearing of the flexible drive shaft of FIG. 14.
Figure 20:
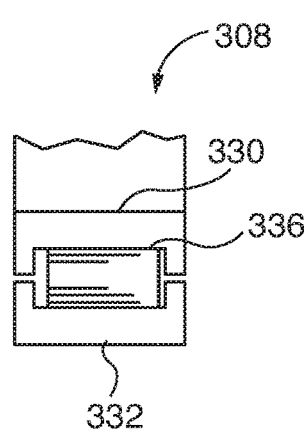
FIG. 20 is a partially cross sectional detail view of still another bearing of the flexible drive shaft of FIG. 14.

Bearings 308 refer to a bearing assembly including ball or rollers, hereinafter referred to as rolling bearing elements, either balls or rollers, and associated races (e.g., races 330, 332 in FIGS. 18-20). Spacing apart of bearings 308 refers to location of bearings 308 along the length of flexible tubular sheath 310. Internal stiffener 314 comprises a helical, metallic filament, such as a coil spring.

Referring to FIG. 14, at least a portion of flexible tubular sheath 310 is translucent or transparent. This enables operating personnel to monitor condition of internal components of flexible drive shaft 300.

Referring particularly to FIG. 16, but also to FIGS. 14 and 15, flexible drive shaft 300 is used in conjunction with a utilitarian power device including flexible drive shaft 300. The utilitarian power device comprises a power associated apparatus, and flexible drive shaft 300 connected to the power associated apparatus. Flexible drive shaft 300 comprises elongated flexible core 306, and a plurality of bearings 308 each including complementary bearing races and rolling bearing elements within the complementary bearing races, wherein each bearing 308 is spaced apart from every adjacent bearing 308, flexible tubular sheath 310 enclosing elongated flexible core 306 and the plurality of bearings 308, flexible tubular sheath 310 contacting each outmost one of the complementary bearing races of the plurality of bearings 308 and avoiding contact with elongated flexible core 306. Flexible tubular sheath 310 includes flexible annular wall 312 and internal stiffener 314 embedded within flexible annular wall 312 and contained within inner and outer surfaces of flexible annular wall 312. Elongated flexible core 306 is rotatably supported on the plurality of bearings 308.

The utilitarian power device is only part of a complete, self-contained appliance capable of performing a task; alternatively stated, the utilitarian device may be an incomplete appliance. It is utilitarian in that it provides at least one necessary function required to make the appliance operable. Illustratively, the utilitarian device may comprise power plant 302 or a portion thereof, or alternatively, may comprise power driven appliance 304 or a portion thereof, or in a still further alternative, any combination of these.

Figure 17:
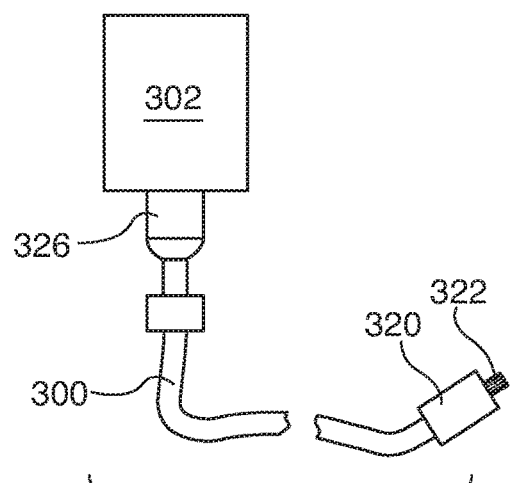
FIG. 17 is a schematic top plan view of an appliance utilizing the flexible drive shaft of FIG. 14, according to at least one aspect of the disclosure.
Figure 21:
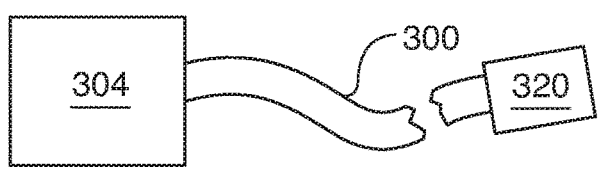
FIG. 21 is a schematic side view of a partial appliance utilizing the flexible driveshaft of FIGS. 14 and 15.

As illustrated in the examples of FIGS. 16 and 17, the power associated apparatus comprises power plant 302. Alternatively, as illustrated in FIG. 21, the power associated apparatus comprises power driven appliance 304. It would be possible to connect flexible driveshaft 300 of a power associated apparatus to a complementary device, such as power driven appliance 304, where the power associated apparatus comprises power plant 302, or to power plant 302, where the power associated apparatus comprises power driven appliance 304. In a further option, flexible driveshaft 300 may be connected to another power transmitting shaft.

Where the utilitarian power device (either a power producing power plant 302 or a power consuming power driven appliance 304) is an incomplete appliance including flexible drive shaft 300, the latter may be provided with a suitable terminal or interface apparatus (e.g., power connection head 320, FIG. 16) enabling ready connection to that element missing from the incomplete appliance (i.e., either a power driven appliance 304 or a power plant 302). To that end, in the utilitarian power device, the suitable terminal or interface apparatus will include firstly, a coupler enabling drive shaft 300 to be retained on that element completing the appliance, and secondly, an element assuring that the internal cable of driveshaft 300 can engage and rotate or be rotated by the added element completing the appliance. One example of a coupler is a compression collar (not shown) having threads for engaging corresponding threads which are an integral part of the added element. The compression collar may comprise male threads for mating with female threads of the added element, or may comprise female threads for mating with male threads of the added element. Another example of a coupler is an outwardly projecting flange or outwardly projecting tabs having holes or slots for receiving a threaded fastener which can then be driven into threaded holes in the added element to pin the otherwise free end of drive shaft 300 to the added element.

An example of the element assuring that the internal cable of driveshaft 300 can engage and rotate or be rotated by the added element is a solid, monolithic, rigid square drive crimped over or otherwise suitably coupled to elongated flexible core 306 of drive shaft 300. As an alternative, the element assuring that the internal cable of driveshaft 300 can engage and rotate or be rotated by the added element may be a female member, such as a square hole socket, star hole socket (e.g., Torx®), and the like.

Regardless of its specific form, the terminal or interface device will be selected to be readily installed by hand and/or by use of hand tools to a corresponding portion of the added element rendering the appliance complete.

In another implementation of the disclosure the power associated apparatus comprises a power driven appliance 304, or a power transmission device such as power connection head 320 for transmitting torque to power driven appliance 304 (FIG. 16). Flexible drive shaft 300 is utilized with an interface apparatus enabling fastening of flexible drive shaft 300 at each end to a power plant (e.g., power plant 302) and to a power driven appliance (e.g., power driven appliance 304). Power connection head 320 is representative of an interface apparatus. Interface apparatuses may take other forms, such as sockets (not shown), flanges bearing bolt holes (not shown), and others. In various examples (not illustrated), power driven appliance 304 comprises at least one of a liquid pump, a gas compressor, a rotatable cutting blade, a rotatable abrading element, a mixer, a vacuum pump, a generator, a ball mill, a reel, a winch, a drive pulley, a blower, a rotatable scrubber, a rotatable extrusion device, an agitator, a centrifuge, a polisher, a conveyor belt, or a drive wheel for a mobile vehicle, among other items.

Figure 22:
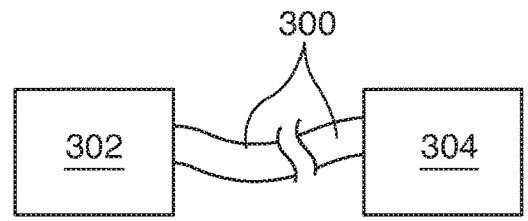
FIG. 22 is a schematic side view of an appliance utilizing the flexible driveshaft of FIGS. 14 and 15.

In an implementation of the disclosure shown in FIG. 22, the power associated apparatus comprises power plant 302 and power driven appliance 304, wherein power plant 302 is drivably coupled to power driven appliance 304 by a power transmission element comprising flexible drive shaft 300.

As seen in FIG. 16, power driven appliance 304 may be adapted to be carried on or may be integral with a backpack 316. For backpack carried applications, an output device 318 conducting torque from power plant 302 is arranged to project from the side of the person wearing backpack 316, but with the axis of rotation of the drive facing forwardly. Output device 318 is arranged to pivot between right and left sides, to accommodate right- and left-handed access to power. That is, flexible drive shaft 300 may terminate at its connection to power from output device 318 at the right of the torso of the user, or at the left of the torso of the user.

Flexible drive shaft 300 has a power connection head 320 from which projects a power transmitting element such as gear 322. Power driven appliance 304 connects to power from power connection head 320, and latches thereto. Power connection head 320 may also carry power plant controls, such as a lever 324 for controlling power plant 302. Lever 324 may for example draw a cable 382 coupled to flexible drive shaft 300, for controlling the throttle of an internal combustion engine (not shown). Therefore, as illustrated in the example of FIG. 16, power device 340 (see FIG. 17) further comprises a control for controlling power plant 302, wherein at least a portion of the control is coupled to flexible drive shaft 300. In this example, the control encompasses both lever 324 and cable 382, and may include additional apparatus engaging a throttle (not separately shown) of power plant 302.

Still referring to the example of FIG. 16, power device 340 further comprises body harness 316 arranged to support the power associated apparatus on the body of a person. Body harness 316 may comprise flaccid straps 380 shown in FIG. 16. However, body harness 316 will be understood to encompass rigid frame members (not shown) in addition to or instead of flaccid straps 380.

Turning to an example shown in FIG. 17, optionally, power device 340 further comprises overrunning clutch 326 interposed between power plant 302 and flexible drive shaft 300. Overrunning clutch 326 enables power plant 302, if an internal combustion engine, to continue to run (i.e., idling) as a convenience to avoid period restarts, without rotating elongated flexible core 306 (FIG. 14), when operation of power driven appliance 304 (FIG. 16) is not actually required.

Rolling bearing elements (as opposed for example to shell type bearings, not shown) of flexible drive shaft 300 may take a number of forms. Illustratively, and as shown in FIG. 18, rolling bearing elements 328 are spherical. Spherical rolling bearings elements 328 allow for a compact bearing type while reducing friction compared to shell type bearings. Alternatively, the rolling bearing elements may be elongated rather than spherical, to accommodate additional loading compared to spherical rolling bearing elements 330. As shown in FIGS. 19 and 20, rolling bearing elements 334 are elongated. In the example of FIG. 20, rolling bearing elements 336 are cylindrical. Cylindrical roller bearing elements 336 limit the entire load imposed on bearing races 330, 332 to thrust loads. In the example of FIG. 19, rolling bearing elements 334 are each tapered along their respective lengths. In each of the types of bearings 308, rolling bearing elements 328, 334, or 336 are entrapped between opposed upper and lower bearing races 330, 332. Regardless of the type of bearing 308, in flexible drive shaft 300, elongated flexible core 306 is rotatably supported on the plurality of bearings 308.

Referring to FIG. 15, flexible drive shaft 300 may further comprise a plurality of flexible tubular spacers 338 each located between two adjacent ones of the plurality of bearings 308. Flexible tubular spacers 308 prevent bearings 308 from moving spontaneously along flexible tubular sheath 310 over time. This in turn assures that bearing points supporting elongated flexible core 306 remain in locations preventing contact between the latter and flexible tubular sheath 310. Each one of the flexible tubular spacers 308 abuts flexible tubular sheath 310.

A method of transferring torque from a power plant outputting torque to a power driven appliance comprises inputting the torque output by power plant 302 to elongated flexible core 306 of flexible drive shaft 300, encasing elongated flexible core 306 within flexible tubular sheath 310, reinforcing flexible tubular sheath 310 against collapse with internal stiffener 314 embedded within flexible annular wall 312 of flexible tubular sheath 310, and supporting elongated flexible core 306 on a plurality of bearings 308 including complementary bearing races and rolling bearing elements within the complementary bearing races such that elongated flexible core 306 is spaced apart from flexible tubular sheath 310, and each bearing 308 is spaced apart from every adjacent bearing 308. The method also comprises transferring torque from power plant 302 to power driven appliance 304 via flexible drive shaft 300. The advantage of using drive shaft 300 is that the construction recited herein allows for greater bending than is generally feasible with known flexible drive shafts, while still preventing collapse, kinking, and localized flattening of flexible drive shaft 300.

It will be appreciated that many features presented herein may be utilized with any of the implementations of the subject matter of this disclosure, even though this may not be explicitly described. For example, flexible drive shaft 300 may be incorporated into multi-application unit 100 and modular power plant and power driven application system 200.

While the present disclosure has been described in connection with what is considered the most practical and preferred embodiment, it is to be understood that the present disclosure is not to be limited to the disclosed arrangements, but is intended to cover various arrangements which are included within the spirit and scope of the broadest possible interpretation of the appended claims so as to encompass all modifications and equivalent arrangements which are possible.

It should be understood that the various examples of the apparatus(es) disclosed herein may include any of the components, features, and functionalities of any of the other examples of the apparatus(es) disclosed herein in any feasible combination, and all of such possibilities are intended to be within the spirit and scope of the present disclosure. Many modifications of examples set forth herein will come to mind to one skilled in the art to which the present disclosure pertains having the benefit of the teachings presented in the foregoing descriptions and the associated drawings.

No element, act, or instruction used in the description of the present application should be construed as critical or essential to the embodiments unless explicitly described as such. Also, as used herein, the article "a" is intended to include one or more items.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

All United States patents and applications, foreign patents, and publications discussed above are incorporated herein by reference in their entireties.

The invention claimed is:

1. A multi-application power unit for selectively driving a plurality of power driven appliances, the multi-application power unit comprising:
   at least one power plant including an output shaft bearing a power connection element;
   a plurality of power driven appliances; and
   a platform including a variable position power plant engagement securing the power plant to the platform and enabling the power plant to be moved among a plurality of selectable power plant positions each enabling coupling of the power connection element of the power plant to at least one of the plurality of power driven appliances when the at least one power driven appliance is coupled to the platform proximate a selectable power plant position, wherein each power plant position includes a coupling retaining a power driven appliance to the platform.

2. The multi-application power unit of claim 1, wherein the variable position power plant engagement comprises a track system entrapping the at least one power plant by interference fit.

3. The multi-application power unit of claim 1, wherein the variable position power plant engagement comprises a rail fixed to the platform, and the power plant comprises rollers dimensioned and configured to roll along the rail.

4. The multi-application power unit of claim 1, further comprising a plurality of power driven appliances removably attachable to and coupled to the platform, wherein each one of the plurality of power driven appliances is located proximate one of the plurality of selectable power plant positions such that the power plant can be moved into drivable engagement with any one of the power driven appliances when the one power driven appliance is coupled to the platform at one of the selectable power plant positions.

5. The multi-application power unit of claim 1, wherein the track system comprises channels recessed into the platform, and each of the channels constrains the power plant to move among the selectable power plant positions.

6. The multi-application power unit of claim 5, wherein the channels are arrayed orthogonally.

7. The multi-application power unit of claim 6, wherein the channels include at least two parallel paths in a first direction and at least one path spanning the at least two parallel paths.

8. The multi-application power unit of claim 7, wherein the at least two parallel paths comprise three parallel paths.

9. The multi-application power unit of claim 1, further comprising a manual mover capable of moving the power plant to one of the plurality of selectable power plant positions.

10. The multi-application power unit of claim 9, wherein the manual mover comprises a lever movable to at least two active positions, wherein in each of the at least two active positions, the lever has moved the power plant to coupling proximity to one power driven appliance when the power driven appliance has been fastened to the platform at a selectable power plant position.

11. The multi-application power unit of claim 10, wherein the manual mover may comprise a gate assembly having at least two end slots dimensioned and configured to receive the lever and to constrain the lever to move along a travel path wherein the lever can move the power plant selectively to one of the active positions at one end slot, and to a second one of the active positions at the other end slot.

12. The multi-application power unit of claim 11, further comprising a power plant controller operably mounted to the gate assembly and connected to the power plant.

13. The multi-application power unit of claim 10, wherein each of the at least two active positions is linearly opposed to another of the at least two positions, whereby the power plant can be connected selectively to two power driven appliances by linear motion.

14. The multi-application power unit of claim 11, wherein the gate assembly includes an intermediate slot between the two end slots, wherein moving the lever to occupy the intermediate slot moves the power plant to a neutral position wherein no power driven appliances will be engaged.

15. The multi-application power unit of claim 1, wherein the track system comprises grooves and the power plant has feet slidable along the grooves.

16. The multi-application power unit of claim 1, further comprising a slidable engagement coupling the power connection element of the power plant to one power driven appliance, the slidable engagement coupling including a splined shaft on one of the power plant and the power driven appliance and a splined socket on the other one of the power plant and the power driven appliance.

17. The multi-application power unit of claim 16, wherein the splined socket comprises a beveled portion configured to guide the splined shaft into concentric driving engagement therewith.

18. The multi-application power unit of claim 1, further comprising a slidable engagement coupling the power connection element of the power plant to at least one of a plurality of power driven appliances, wherein
   one of the power plant and the power driven appliances comprises a splined socket and the other one of the power plant and the power driven appliances comprises an unsplined shaft having a first keyway, and a splined head removably attachable to the unsplined shaft; and
   the splined head comprises a collar fixed thereto, the collar comprising a second keyway, a key matingly compatible with the first keyway and the second keyway, and a setscrew for engaging the unsplined shaft.

* * * * *